Figure 1:
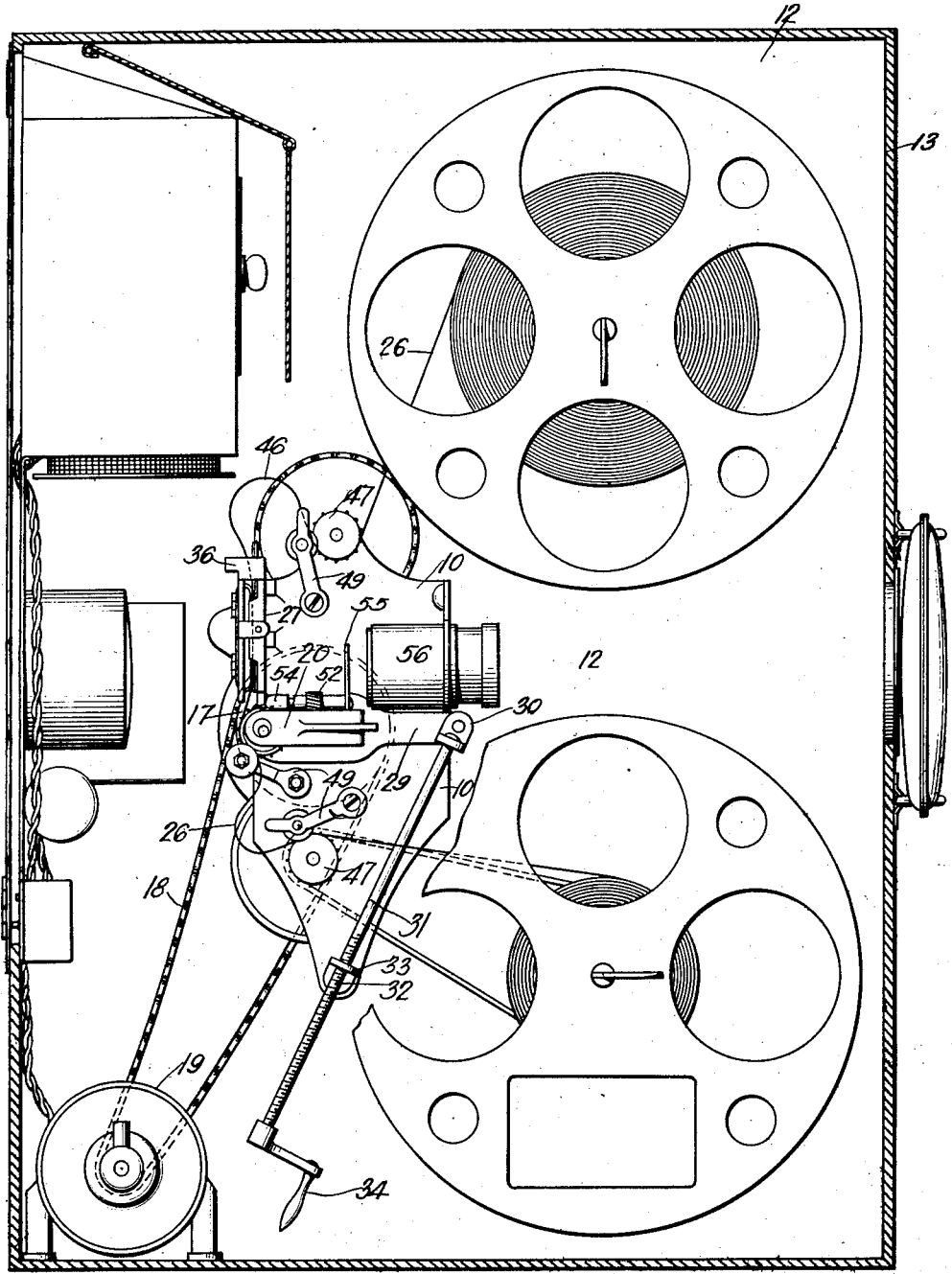

F. C. TAYLOR.
MOVING PICTURE PROJECTOR.
APPLICATION FILED FEB. 19, 1918.

1,298,600.

Patented Mar. 25, 1919.
3 SHEETS—SHEET 1.

WITNESSES

INVENTOR
F. C. Taylor
BY
ATTORNEYS

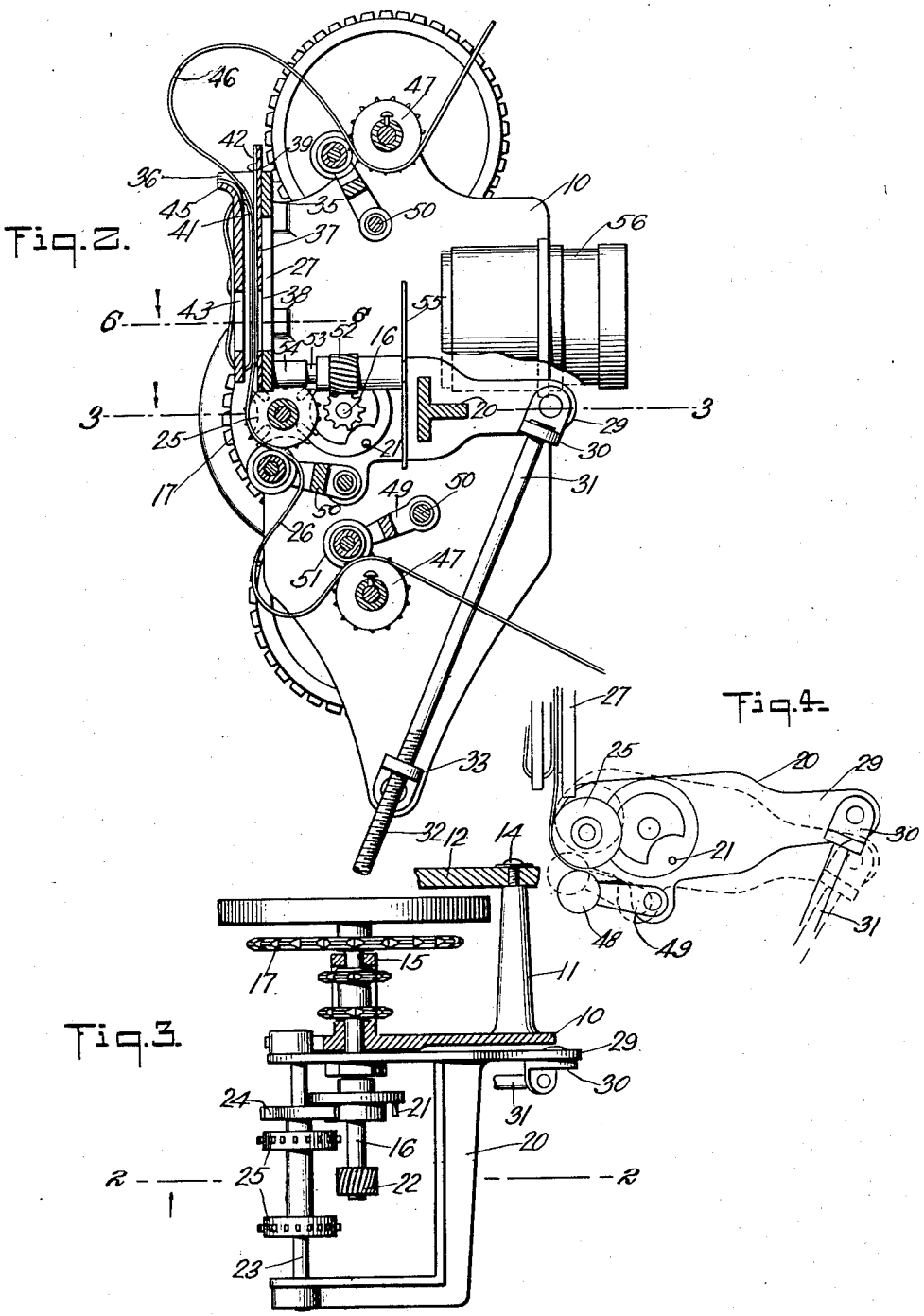

F. C. TAYLOR.
MOVING PICTURE PROJECTOR.
APPLICATION FILED FEB. 19, 1918.
1,298,600.
Patented Mar. 25, 1919.
3 SHEETS—SHEET 3.
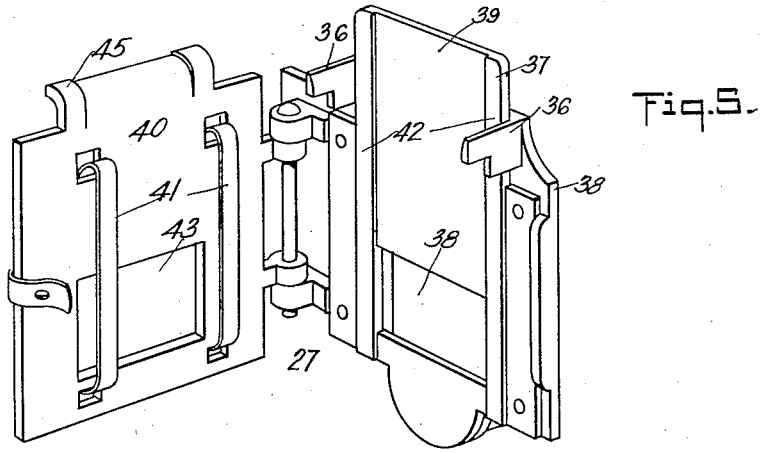
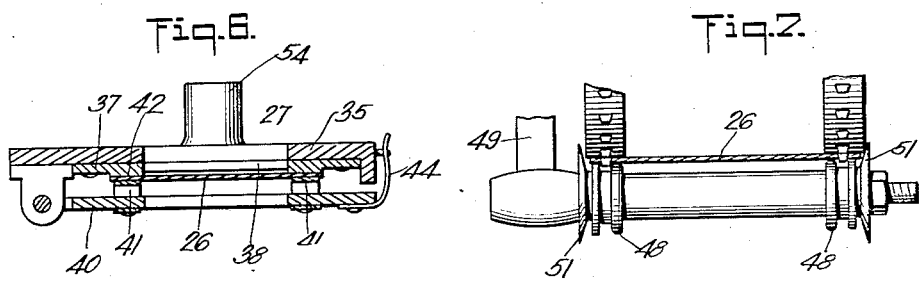
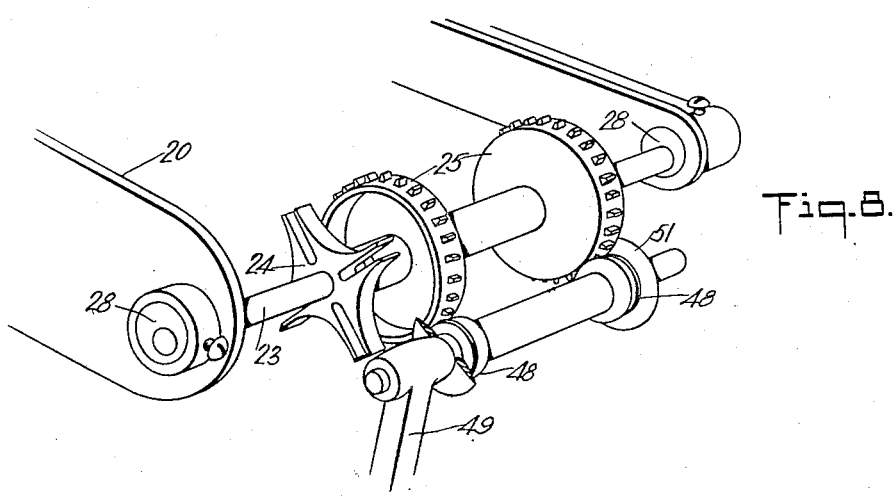
WITNESSES
INVENTOR
F.C. Taylor
BY
ATTORNEYS

UNITED STATES PATENT OFFICE.

FREDERICK C. TAYLOR, OF NEW YORK, N. Y., ASSIGNOR TO FERDINAND McCANN, OF SAN FRANCISCO, CALIFORNIA.

MOVING-PICTURE PROJECTOR.

1,298,600. Specification of Letters Patent. Patented Mar. 25, 1919.

Application filed February 19, 1918. Serial No. 218,150.

*To all whom it may concern:*

Be it known that I, FREDERICK C. TAYLOR, a citizen of the United States, and a resident of the city of New York, borough of Manhattan, in the county and State of New York, have invented a new and Improved Moving-Picture Projector, of which the following is a full, clear, and exact description.

My invention relates to a moving-picture projector of the portable type. It is characterized by its compactness and the facility with which it may be operated, and is provided with all the adjustments found in the machines of the stationary type.

An object of the invention is to provide a simple and inexpensive moving-picture projector having an intermittent film-feeding device mounted on an oscillating frame the adjustment of which controls the framing of the picture.

Another object of the invention is to provide a moving-picture projector which has a film gate provided with guiding means at the upper edge which not only facilitates the engagement of the film with the gate but also guides the film of the upper loop while the same is formed, before it is drawn through the gate.

A further object of the invention is to provide a moving-picture projector in which the shutter is interposed between the gate opening and the lens.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views.

Figure 1 is an elevation of a portable projector case equipped with a moving-picture projector embodying my invention;

Fig. 2, an enlarged vertical section through the moving-picture projector shown on lines 2—2, Fig. 3;

Fig. 3, a section on line 3—3, Fig. 2;

Fig. 4, a side elevation of the oscillating frame by the movement of which the framing of the picture is obtained, the full and dotted line positions showing the displacement of the frame;

Fig. 5, a perspective view of the gate;

Fig. 6, a cross section on line 6—6, Fig. 2;

Fig. 7, an elevation of the film-guiding rollers which coöperate with the intermittent feed sprockets; and Fig. 8, a perspective view of the intermittent feed sprockets and the guiding rollers.

Referring to the drawings, 10 is the bed plate which has suitable legs 11 whereby it is spaced from the back 12 of the case 13 to which it is secured by suitable means 14. The bed plate 10 has also a brace 15 which with the plate forms bearings for the main shaft 16. The shaft carries a sprocket 17 which is connected by an endless chain 18 to a motor 19 mounted in the case 13. The portion of the shaft projecting in front of the bed 10 forms a bearing for a frame 20 which is mounted to oscillate on the shaft 16.

This portion of the shaft also carries a crank pin 21 and a worm pin 22. (See Fig. 3). The crank pin 21 turns intermittently a shaft 23 through the medium of a Geneva gear 24 constrained to rotate with the shaft 23. The shaft also carries a pair of sprockets 25 constrained to rotate with the shaft 23 and which are adapted to engage a film 26 which is passed through a gate 27 carried by the bed plate 10.

The shaft 23 is preferably mounted eccentrically in bearing blocks 28 for which the frame 20 forms the bearing. (See Fig. 8). By this means the shaft 23 may be adjusted to and from the shaft 16 to obtain the desired engagement between the crank pin and the Geneva gear.

The frame 20 has an arm 29 to the end of which a swivel bracket 30 is secured. This bracket supports one end of a rod 31 so that the same is free to revolve in the bracket but is prevented from moving axially. (See Figs. 1 and 2). The rod has a threaded section 32 in threaded engagement with a bracket 33 which is mounted to swivel on the bed plate 10. The rod has a suitable crank 34 whereby it may be rotated and, in consequence, the frame 20 oscillated on the main shaft 16, thus moving the feeding sprockets 25.

The gate 27 has a back 35 provided with forwardly-directed lugs 36 at the upper edge of the back, the distance between the lugs being substantially equal to the width of the film which is to be drawn through the gate. (See Figs. 5 and 6). Preferably the upper edges of the lugs are rounded so as to facilitate the movement of the film into the gate between the lugs 36. The gate back 35 carries a wear plate 37 which has an opening 38 for framing the picture on the film. This wear plate 37 is preferably depressed between the edges, as shown at 39, so as to prevent injury to the portion of the film which carries the picture.

A swinging door 40 of the gate is provided with a pair of yielding members 41 coöperating with the raised longitudinal portions 42 of the wear plate which form bearings for the edges of the film. The door is provided with a customary opening 43 through which can be seen the relation of the picture on the film to the framing opening 38. A suitable catch 44 is provided on the door for retaining the yielding members 41 against the wear plate 37 whereby the proper pressure on the film within the gate is obtained. The door 40 has also an upper extension 45 which is adapted to enter between the lugs 36. The upper portion of said extension 45 is rounded to present a suitable bearing for the upper loop 46 of the film 26 drawn through the gate.

The bed 10 carries the constant feeding sprockets 47 driven from the main shaft 16 by endless chains engaging suitable sprockets provided on the main shaft and on the shafts which carry the constant feeding sprockets 47. The constant and intermittent feeding sprockets are each provided with the customary film-retaining rollers 48 the shafts of which bear in suitable arms 49 which are in turn mounted on shafts or rods 50 carried by the bed 10. To properly guide the film on the rollers 48, each roller is provided with a disk 51 (see Figs. 7 and 8) the inner face of which tapers outwardly so that the tendency of the film is to always remain on the rollers.

The worm pinion 22 meshes with a similar pinion 52 constrained to rotate with a shaft 53 which bears in a socket 54 forming part of the back 35 of the gate, or a part of the bed 10, if so desired. The shaft 53 also carries a shutter 55 which revolves within the frame 20 and in the rear of the lens 56 which is mounted on the plate 10 in alinement with the opening 38.

When the film is to be retarded for framing purposes the rod 31 is constrained to move the arm 29 downwardly. On the other hand, to advance the film for framing purposes the rod is turned in the opposite direction to move the arm 29 upwardly. This arrangement permits a quick operation of the frame and, therefore, a quick displacement of the intermittent feeding sprockets through a suitable angle, whereby the desired retardation or advance of the film is obtained for the purpose of framing the same with the opening 38.

I claim:

1. In a moving-picture projector, a bed plate, a film gate carried by the plate, a frame mounted to swing on the plate to and from the gate, a swivel bracket associated with the frame, a rod connected to the swivel bracket so as to turn therein but prevented from longitudinal displacement relative to the bracket, a swivel nut carried by the plate and in threaded engagement with the rod, means for revolving the rod whereby the movement of the frame relative to the gate is controlled, and an intermittent film feed carried by the frame for drawing a film through the gate.

2. In a moving picture projector, a film gate having a backplate provided with forwardly extending film guiding lugs, a wear plate secured to the backplate and extending between the lugs, the wear plate being provided with integral raised side portions, the said wear plate extending above the said lugs, and a door hinged to the said backplate and provided with yieldingly mounted members disposed opposite the said raised side portions of the wear plate, the said door having an integral extension at the upper end, the extension fitting between the said lugs and having raised side portions in vertical alinement with the said yieldingly mounted members and in register with the upper ends of the raised side portions of the wear plate.

3. In a moving picture projector, a film gate having a backplate provided with forwardly extending film guiding lugs, a wear plate secured to the backplate and extending between the lugs, the wear plate being provided with integral raised side portions, the said wear plate extending above the said lugs, and a door hinged to the said backplate and provided with yieldingly mounted members disposed opposite the said raised side portions of the wear plate, the said door having an integral extension at the upper end, the extension fitting between the said lugs and having raised side portions in vertical alinement with the said yieldingly mounted members and in register with the upper ends of the raised side portions of the wear plate, the said extension having its inner face rounded off upwardly and outwardly away from the said wear plate and the said lugs having their inner faces rounded off upwardly and outwardly.

4. In a moving picture projector, a gate having a back plate presenting film-guiding lugs at the upper edge thereof directed forwardly of the plate, a wear plate secured to the back plate and located between the lugs, and a door hinged to the back plate and presenting an upper extension adapted to be located between the lugs when the door is maintained against the back plate, said extension having its upper edge rounded away from the back plate, said lugs having their inner faces rounded at the upper edges.

FREDERICK C. TAYLOR.